US009702528B2

(12) United States Patent
Dinant et al.

(10) Patent No.: US 9,702,528 B2
(45) Date of Patent: Jul. 11, 2017

(54) DEVICE FOR ATTENUATING ELECTROMAGNETIC DISTURBANCES, AND MOTOR VEHICLE LIGHT MODULE EQUIPPED WITH SUCH A DEVICE

(71) Applicant: VALEO VISION BELGIQUE, Meslin l'Eveque (BE)

(72) Inventors: Franck Dinant, Virginal (BE); Florestan Debert, Nomain (FR); Mohamed Jaaidane, Les Mureaux (FR); Dirkie Sacchet, Ecaussines (BE); David Boudikian, Paris (FR); Marc Duarte, Villemomble (FR)

(73) Assignee: Valeo Vison Belgique, Meslin l'Eveque (BE)

( * ) Notice: Subject to any disclaimer, the term of this patent is extended or adjusted under 35 U.S.C. 154(b) by 259 days.

(21) Appl. No.: 14/694,202

(22) Filed: Apr. 23, 2015

(65) Prior Publication Data
US 2015/0323159 A1    Nov. 12, 2015

(30) Foreign Application Priority Data

Apr. 28, 2014  (FR) ..................................... 14 53838

(51) Int. Cl.

| F21V 7/00 | (2006.01) |
| F21V 15/01 | (2006.01) |
| F21V 29/70 | (2015.01) |
| F21V 23/00 | (2015.01) |
| F21V 23/02 | (2006.01) |

(Continued)

(52) U.S. Cl.
CPC ............ *F21V 15/01* (2013.01); *B60Q 1/0041* (2013.01); *F21K 9/20* (2016.08); *F21S 48/1104* (2013.01); *F21S 48/115* (2013.01); *F21S 48/211* (2013.01); *F21S 48/215* (2013.01); *F21S 48/30* (2013.01); *F21V 23/005* (2013.01);
(Continued)

(58) Field of Classification Search
USPC .................................. 362/307, 516, 517, 257
See application file for complete search history.

(56) References Cited

U.S. PATENT DOCUMENTS

| 7,674,013 B2 | 3/2010 | Leslie et al. |
| 7,679,100 B2 | 3/2010 | Schwenkschuster et al. |

(Continued)

FOREIGN PATENT DOCUMENTS

| DE | 102004036157 A1 | 2/2006 |
| DE | 102006010977 A1 | 12/2007 |

(Continued)

*Primary Examiner* — Daniel Hess
(74) *Attorney, Agent, or Firm* — Jacox, Meckstroth & Jenkins

(57) ABSTRACT

A device for attenuating electromagnetic disturbances given off by at least one electronic component, arranged on a printed circuit board mounted on a first face of a board support and bearing at least one light-emitting diode driven by the at least one electronic component for the emission of light rays. A containment cage is arranged around at least the electronic component, it is formed partially by walls made of a piece with the first face and on which the printed circuit board rests, so as to delimit a wave containment zone. The containment zone has an opening, in a first direction, suitable for being blocked or not by a closure piece distinct from the walls. The invention further relates to a light module equipped with such a device, and a motor vehicle comprising a light module according to the invention.

28 Claims, 4 Drawing Sheets

(51) Int. Cl.
*B60Q 1/00* (2006.01)
*F21S 8/10* (2006.01)
*F21K 9/20* (2016.01)
*F21Y 115/10* (2016.01)

(52) U.S. Cl.
CPC ............ *F21V 23/02* (2013.01); *F21V 29/70* (2015.01); *F21S 48/328* (2013.01); *F21Y 2115/10* (2016.08)

(56) References Cited

U.S. PATENT DOCUMENTS

| | | |
|---|---|---|
| 8,071,990 B2 | 12/2011 | Bogner et al. |
| 8,465,178 B2 | 6/2013 | Wilcox et al. |
| 8,783,913 B2 | 7/2014 | Wilcox et al. |
| 8,870,426 B2 | 10/2014 | Biebl et al. |
| 2007/0086148 A1 | 4/2007 | Schwenkschuster et al. |
| 2008/0037251 A1 | 2/2008 | Leslie et al. |
| 2009/0001490 A1 | 1/2009 | Bogner et al. |
| 2009/0213613 A1 | 8/2009 | Mitic et al. |
| 2012/0020104 A1 | 1/2012 | Biebl et al. |
| 2012/0057351 A1 | 3/2012 | Wilcox et al. |
| 2013/0208484 A1 | 8/2013 | Alfier et al. |
| 2013/0279167 A1 | 10/2013 | Wilcox et al. |
| 2014/0307436 A1 | 10/2014 | Wilcox et al. |

FOREIGN PATENT DOCUMENTS

| | | |
|---|---|---|
| DE | 102009016876 A1 | 10/2010 |
| EP | 1770793 A2 | 4/2007 |

DEVICE FOR ATTENUATING ELECTROMAGNETIC DISTURBANCES, AND MOTOR VEHICLE LIGHT MODULE EQUIPPED WITH SUCH A DEVICE

CROSS-REFERENCE TO RELATED APPLICATIONS

This application claims priority to the French application 1453838 filed Apr. 28, 2014, which application is incorporated herein by reference and made a part hereof.

BACKGROUND OF THE INVENTION

1. Field of the Invention

The present invention relates to a device for attenuating electromagnetic disturbances, and it relates more particularly to the application of such a device in a light module comprising a light-emitting diode.

2. Description of the Related Art

In this type of module, light-emitting diodes are being used increasingly commonly for the emission of light rays in order to produce a lighting and/or signaling function of a motor vehicle. The use of these diodes notably makes it possible to focus the emitted light ray and makes it possible, within a small bulk, together with optical deflection means, to easily direct the light ray output from the light module in a desired direction.

Thermal cooling means are conventionally associated with this type of light module equipped with a light-emitting diode, since this diode is borne by a printed circuit board that also bears electronic components to produce the power supply and drive the diode. These components have to be cooled for them to operate correctly when required and for their resistance over time.

Some of these electronic components, for example a DC/DC converter, generate electromagnetic disturbances, and it is best to prevent them from being diffused outside the module to prevent them from affecting other electronic gear present in the vehicle. To this end, it is known practice to use a metal cage, acting as a Faraday cage, that is positioned covering the printed circuit board. These metal cages can be costly, and they have a design that is set by the constructors of these cages which can affect the design and the arrangement of the electronic components on the printed circuit board.

SUMMARY OF THE INVENTION

The present invention lies within this context, by seeking to offer a device for attenuating electromagnetic disturbances which does not have the abovementioned drawbacks, and which is particularly simple to implement and can be adapted to different module configurations.

The present invention proposes a device for attenuating electromagnetic disturbances given off by at least one electronic component, arranged on a printed circuit board which is mounted on a first face of a board support and which bears at least one light-emitting diode driven by the at least one electronic component for the emission of light rays, the device comprising an electromagnetic wave containment cage arranged around at least the electronic component. According to the invention, the cage is formed partially by walls made of a piece with the first face of the board support and on which the printed circuit board rests, so as to delimit, in the board support and on the printed circuit board, a wave containment zone. Also, the containment zone has an opening, in a first direction, suitable for being blocked, according to the attenuation needs of the device, by a closure piece distinct from the walls.

Thus, an attenuation device is proposed which is easy to produce, notably formed by a specific molding. This makes it possible for example to form the support by molding it in such a way as to form a cap or a radiator, also designed for the general cooling of the light source, even by molding it in such a way as to form a radiator which itself forms a cap.

The device according to the invention makes it possible to provide, in the housing suitable for receiving the electronic components, an opening which makes it possible to adapt to the different cases in which the attenuation device is installed. As an example, depending on the position of the module in the motor vehicle as a whole, it will be possible to take the electromagnetic disturbances into consideration, or not, and dispense with the attached element if the electromagnetic disturbances are deemed insignificant. There is then a saving on the material, hence a weight saving, and an opening is favored that makes it possible to cool the electronic components and the printed circuit board by ventilation. In the case where, on a different vehicle, the electromagnetic disturbances have to be taken into consideration because the module is closer to the vehicle interior, it will be possible to plan to close the housing and the electronic components using the attached element.

The device according to the invention can comprise one or more of the following features:
- the diode or diodes is/are driven by a number of components, all of these components being contained in the cage;
- the electronic component driving the light-emitting diode is a component of a voltage converter; according to one embodiment of the invention, this converter is a DC/DC converter, notably a switched-mode converter; according to one embodiment of the invention, the voltage conversion is produced by a number of components, these components all being housed in the cage, the components not involved in this conversion, for example components protecting the converter against electromagnetic noise or overvoltages, being able to be housed outside the cage;
- the containment walls comprise two substantially parallel lateral walls and a transverse wall linking them at a longitudinal end, delimiting between them the containment zone with the opening which can extend substantially parallel to the transverse wall;
- the transverse wall has a substantially planar free end on which the printed circuit board bears in such a way that it extends on either side of the transverse wall;
- the board bears a plurality of electronic components which are distributed, according to their capacity to produce electromagnetic disturbances, on either side of the transverse wall;
- the lateral walls have a free end such that a curb prolongs the side of the lateral wall opposite the containment zone, by forming a seat for receiving a lateral end of the printed circuit board;
- the board support is hollowed out at least in the containment zone, such that an edge extends along the opening of the containment zone; the bottom wall of the containment zone comprises an additional wall which extends facing the edge delimiting the opening, such that a gulley runs along the edge between the latter and the additional wall; each lateral containment wall has, at its end facing toward the opening, a chicane running in the direction away from the opposite lateral wall and in that the gulley extends to the chicane.

According to other features of the invention, the diode is arranged on an outer face of the printed circuit board, turned away from the board support, whereas the at least one electronic component is arranged on the inner face of the board, turned toward the board support, so as to be housed in the containment zone. Also, the board support may bear thermal cooling means on its outer face.

The board support can, according to different embodiments of the invention, be incorporated in the support casing, or else, as will be described in more detail hereinbelow, be formed by a closure cap of a housing formed in the support casing.

The invention relates also to a light module for lighting and/or signaling of a motor vehicle, of the type comprising at least one light-emitting diode suitable for emitting light rays toward optical deflection means so that these rays are directed toward an output face of the module, the module comprising a printed circuit board to which the at least one light-emitting diode is attached, as well as at least one electronic component driving the operation of the at least one diode. The module according to the invention comprises, on the one hand, a support casing in which a cavity is formed to house the printed circuit board for the correct positioning of the diode, and, on the other hand, a board support suitable for bearing the printed circuit board. The module comprises a device for attenuating the electromagnetic disturbances generated by the at least one electronic component, the attenuation device comprising a cage formed partially by walls made of a piece with the inner face of the board support and comprising an opening produced in a first direction.

A closure piece can block the opening. Whereas the walls are made of a piece with the board support, the closure piece is distinct from these walls.

According to one embodiment of the invention, the closure piece is made of a metallic material. This makes it possible to reinforce the attenuation of the electromagnetic disturbances generated by the at least one electronic component.

According to an advantageous embodiment, the closure piece is electrically connected to a metallic surface of the reflector. This further reinforces the attenuation by the closure piece of the electromagnetic disturbances generated by the at least one electronic component. This metallic surface of the reflector can be a reflecting surface of the reflector, notably that intended to return the light rays originating from the light source of the light module. This surface can for example be a metallic layer deposited on a material, notably by aluminum plating.

According to features specific to an embodiment of the invention, the closure piece is an element attached to the printed circuit board so as to extend between the board and the board support. The closure piece is then designed to be fixed to a first end to the printed circuit board and to be housed at the other end in a gulley formed in the board support.

The board support is moreover hollowed out in such a way that it forms a housing for the at least one electronic component driving the operation of the at least one light-emitting diode, and the gulley is formed by an edge of the housing and an additional wall which extends substantially parallel to this edge. The gulley advantageously forms a chicane blocking the path of the electromagnetic waves.

Provision will be made for the height of the closure piece to be such that this closure piece extends in the gulley without contact with the bottom wall of the gulley. Thus, an air passage is left between the closure piece and the gulley for the ventilation of the electronic components present in the containment zone.

According to features of the invention, the closure piece comprises bosses, which extend by protruding from the plane of the piece substantially in the vicinity of the end suitable for being housed in the gulley. It can take the form of a piece of folded plate, and this piece can comprise tongues which prolong, in the plane of the piece, the edge of the piece suitable for being in contact with the printed circuit board, the tongues being suitable for cooperating with slots formed in the printed circuit board. These tongues can for example be electrically connected to a metallic surface of the reflector, as described above.

Advantageously, the piece of folded plate is made of stainless steel, this choice of material on the one hand allowing a good flexibility of the piece for easy folding of the tongues after the latter have been passed through the slots and for the deformation of the bosses in the gulley, and on the other hand making it possible to prevent the oxidation of the closure piece.

In a variant embodiment, provision will be able to be made for the closure piece to be a wall made of a piece with the support casing of the reflector. For example, the closure piece is an extension of the support casing and it is formed by a material coated with a metallic layer, for example by aluminum plating. According to one embodiment of the invention, this piece is then electrically connected to the board support, notably when the support is a radiator made of metal. This connection is made by a contact means, for example a metal blade. The support casing and the reflector can be made of the same material in a single piece. Thus, the closure piece and the reflector can, for example, be aluminum-plated at the same time during their manufacture.

According to other features of the invention:
  the opening faces in the same direction as that of emission of the light by the light module;
  the device for attenuating electromagnetic disturbances is a device as has just been described previously;
  the board support is a cap making it possible to close the casing; the casing can be the case of the module, the case comprising a first orifice closed by a closure outer lens forming the output face of the module, and a second orifice closed by the support;
  the casing comprises an inner wall forming a reflecting wall, the optical deflection means comprising the reflecting wall or being formed by the reflecting wall.

The invention relates also to a motor vehicle comprising at least one light module as has just been described briefly and as will be detailed hereinbelow. Notably, in the motor vehicle according to the invention, a specific orientation of the module is favored for the opening of the containment zone to face away from the vehicle interior.

Other features and advantages of the invention will become apparent on reading the following detailed description of an embodiment and for an understanding of which reference will be made to the attached Figs. in which:

BRIEF DESCRIPTION OF THE ACCOMPANYING DRAWINGS

DETAILED DESCRIPTION OF THE PREFERRED EMBODIMENTS

Figure 1:
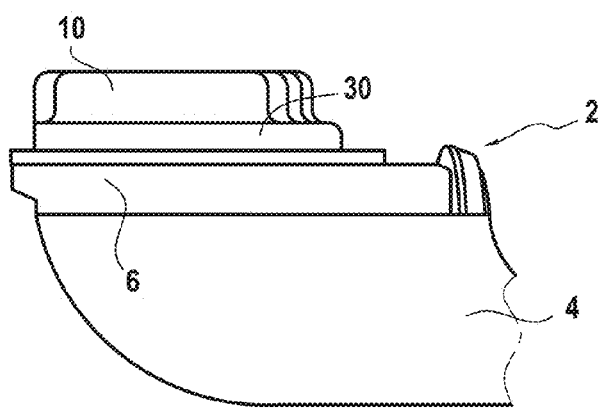
FIG. 1 is a cross-sectional view of a reflector of a light module according to the invention, on which optical deflection means are partially represented, covered by a support casing and an associated cap.
Figure 2:
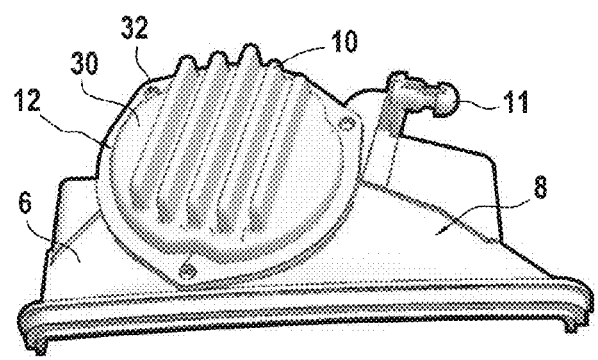
FIG. 2 is a perspective view, from above, of the support casing and of the cap illustrated in FIG. 1.

A light module notably comprises a reflector 2 facing which is positioned a light-emitting diode borne by a printed circuit board. The reflector 2 has on the one hand optical deflection means 4 (visible in FIG. 1), advantageously having a substantially elliptical form, for deflecting the light rays emitted by the diode toward an output face of the module which is here not represented, and on the other hand a support casing 6 which covers the top end of the optical deflection means, secured to the casing. The support casing 6 substantially takes the form of a planar covering wall, which has, on an outer face 8 (FIG. 2), facing away from the optical deflection means 4, heat exchange means 10, and which has means 11 (FIG. 2) for fixing to a frame of the module.

Figure 3:
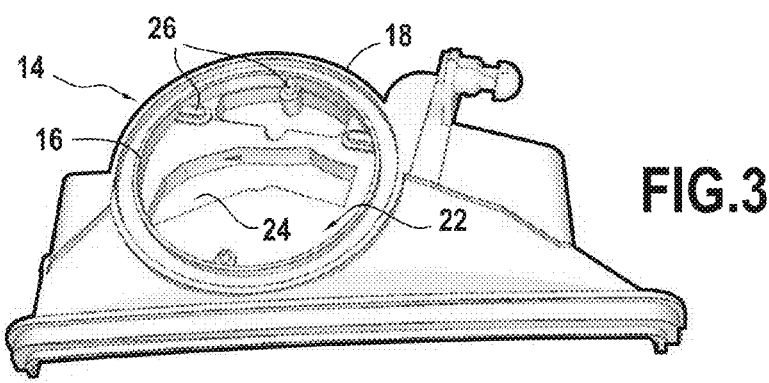
FIG. 3 is a view similar to FIG. 2 with just the support casing.

As illustrated in the figures, the heat exchange means 10 are formed on an outer face of a cap 12, arranged in a housing 14 (visible in FIG. 3) formed in the covering wall of the support casing 6, by ribs protruding from the cap 12 away from the covering wall.

Figure 5:
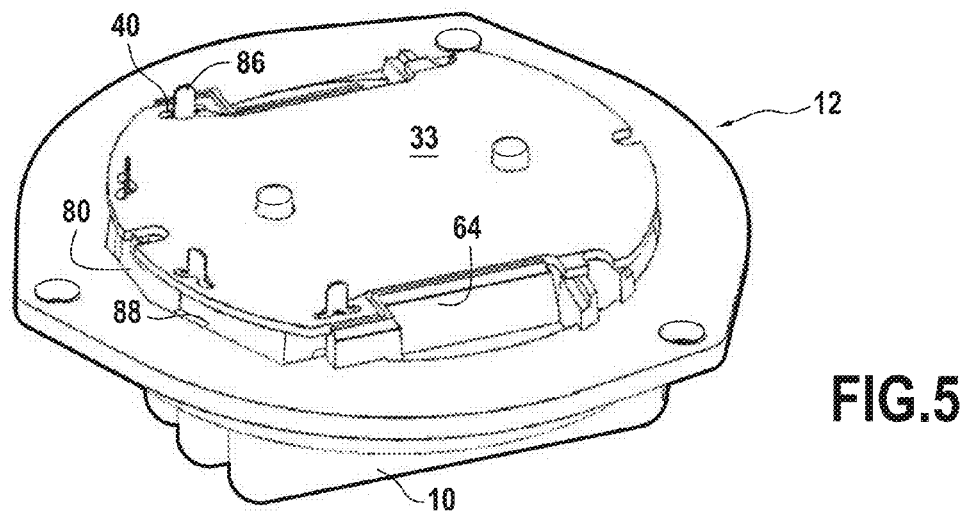
FIG. 5 is a view of the cap of FIG. 4, seen in perspective, this time from below, a printed circuit board and an attached element also being represented.
Figure 12:
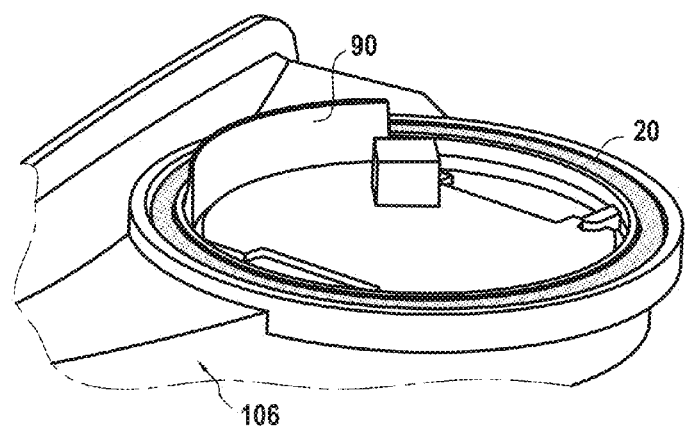

The housing 14 has two concentric annular walls 16, 18, between which a seal 20 is housed, visible only in FIG. 12 and compressed when the cap 12 is mounted on the support casing 6, and a cavity 22 formed inside the inner annular wall 16. The cavity 22 has a hole 24 passing through the covering wall, so as to allow the passage of the light rays emitted by the light-emitting diode, as will be described hereinbelow, indexing studs 26 to allow for the correct positioning of the printed circuit board bearing this light-emitting diode. The hole 24 extends transversely, so as to allow the transverse diffusion of the rays emitted by the diode over the entire transverse dimension of the optical deflection means 4 after these rays have passed through the covering wall of the support casing 6. In the example illustrated, four indexing studs 26 have been provided and complementary forms are provided on the cap 12 that is pressed onto the housing 14, and possibly onto the printed circuit board borne by the cap 12, as can be seen in FIG. 5.

Figure 4:
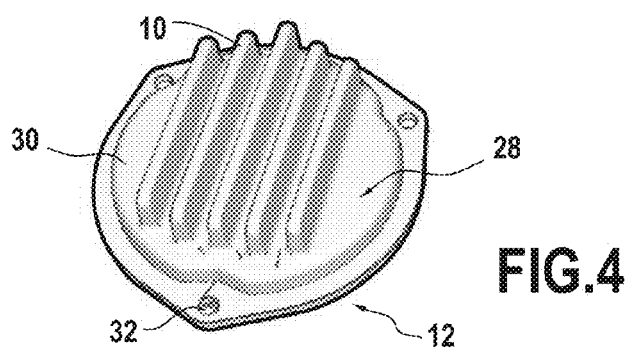
FIG. 4 is a view similar to FIG. 2 with just the cap.

The cap 12 is illustrated in FIG. 4 seen from above, that is to say with the outer face 28, bearing heat exchange ribs, which is visible. The cap 12 has, on this outer face 28, a central overthickness 30 (FIGS. 1, 2 and 4), suitable for allowing consequent recessing of the opposite inner face 31 for the housing 14 of the printed circuit board. The cap 12 further comprises boreholes 32 for fixing to the support casing 6, so as to ensure the fixing of the cap 12 on the support casing 6 via screwing means which are not represented.

A first embodiment is described, illustrated in FIGS. 5 to 8, in which a printed circuit board 33 is mounted on the inner face 31 of the cap 12 visible in these figures, with an attached element 34 which closes an opening left between the sheet and the cap 12.

The printed circuit board 33 consists of a sheet on which the light-emitting diode is soldered together with the electronic components for driving the operation of the diode, according to control instructions received by a module associated with the diode. When the printed circuit board 33 is mounted on the inner face 31 of the cap 12, it will be understood that the diode is soldered on the outer face of the printed circuit board 33, opposite the cap 12 to be able to emit light rays toward the optical deflection means 4 through the through-hole 24, while the electronic components are soldered on the inner face of the printed circuit board 33, facing toward the cap 12.

The electronic components are soldered on the sheet, and these components can advantageously be arranged on the sheet according to their potential for generating electromagnetic waves. It will thus be possible to place the big purveyors of electromagnetic disturbances, such as, for example, a DC/DC direct voltage converter, in a precise zone of the sheet to ensure their placement in the wave containment cage as will be described hereinbelow. Electronic components that create little or no electromagnetic disturbances can, for their part, be arranged anywhere on the sheet.

The sheet has, on its perimeter, notches 36 suitable for cooperating with the indexing studs 26 formed on the support casing 6, and it has at its center boreholes 38 (FIG. 7) suitable for cooperating with indexing pillars formed this time on the inner face of the cap 12, as will be described below. The sheet also comprises slots 40 formed regularly in proximity to a front longitudinal edge 42 of the printed circuit board 33, suitable for cooperating with tongues borne by the attached element 34. Here, four of these slots 40 are provided.

In the example illustrated, the sheet has, at each longitudinal end, rounded edges 44 and, from one longitudinal end to the other, two parallel lateral edges 46 delimited longitudinally by transverse edges 48 which extend these lateral edges 46 at right angles toward the outside of the sheet.

Figure 6:
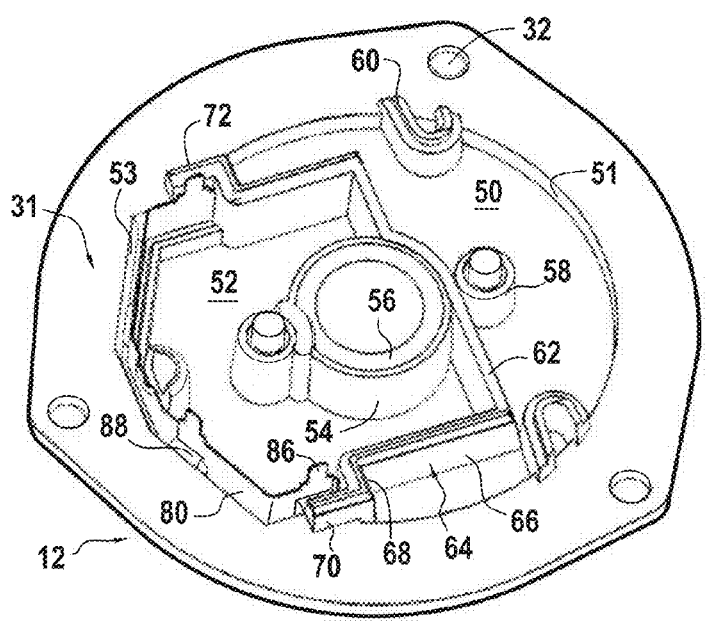
FIG. 6 is a view of the cap and of the attached element of FIG. 5, from a slightly different angle, the printed circuit board having been eliminated to reveal the inner face of the cap.
Figure 7:
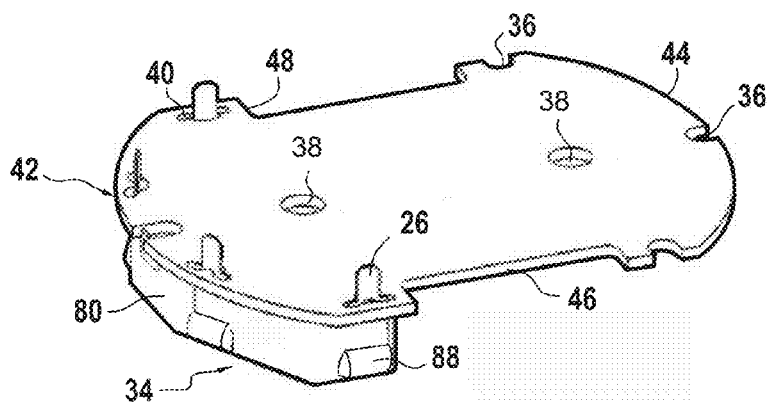
FIG. 7 is a view similar to FIG. 5, in which the cap has been removed to reveal only the printed circuit board and the attached element.

As can be seen in particular in FIG. 6, the inner face 31 of the cap 12 is recessed to form a housing and it has protruding elements suitable for forming a containment cage for the electromagnetic waves generated by the electronic components.

The recessing of the inner face 31 comprises two zones separated substantially transversely by containment walls 64. A first zone 50 is delimited by these walls and by a circular edge 51 and a second zone, forming the containment zone 52, is delimited by these walls and by an edge 53 formed by straight segments.

The inner face 31 of the cap 12 comprises, inside these walls delimiting the housing, a central bush 54, with a gulley 56 on the perimeter to avoid having the thermal tab from jutting out when the printed circuit board 33 is mounted on the cap 12. A thermal tab is in fact placed on the top of the bush 54 suitable for being in contact with the printed circuit board 33 on mounting, to facilitate the transmission of the heat emitted by the diode to the cap 12 and its thermal cooling means.

The inner face 31 of the cap 12 also bears two indexing pillars 58 longitudinally arranged on either side of the central bush 54, and indexing means 60 complementing those formed on the support casing 6 to grip the printed circuit board 33.

As has previously been described, the inner face of the cap 12 has walls extending by protruding from the bottom wall of the housing to delimit the first zone 50 and the containment zone 52. A first transverse wall 62 extends substantially across the housing. Its free end opposite the cap 12 has a planar surface, to serve as support for the printed circuit board 33. The transverse wall 62 is extended at right angles by lateral walls 64 which are connected respectively to one of the lateral ends of the transverse wall 62. These lateral walls 64 have a main part 66, which extends longitudinally in the continuity of the transverse wall 62, and a chicane formed by an intermediate wall 68 which extends transversely to the main part and a terminal wall 70 substantially parallel to the main part.

As can be seen in FIG. 6, in which the printed circuit board 33 has not been represented, the lateral walls 64, unlike the transverse wall 62, do not have a planar surface at their free end, but a curb 72 arranged on the side opposite the containment zone 52 and which forms an abutment when the printed circuit board 33 is positioned on the lateral walls 64.

Thus, when the printed circuit board 33 is in place on the cap 12, as illustrated in FIG. 5, the printed circuit board 33 rests on the planar face of the transverse wall 62 in such a way that it extends on either side of this transverse wall 62, while it rests on the lateral walls 64 with the curbs which surround it.

The lateral walls 64 are truncated at the end of the chicane, so that they do not meet one another, and an opening 74 is thus left at a front longitudinal end of the containment zone 52, between the lateral walls 64, at the level of the edge 53 formed by straight segments.

A front and rear longitudinal end is defined here as a function of the layout in the vehicle. As will be explained hereinbelow, the orientation chosen here is particularly advantageous in that the opening is directed away from the vehicle interior, such that any leaks of electromagnetic waves would not have any consequences. It will however be understood that the orientation of the assembly could change without departing from the context of the invention.

The bottom wall of the housing is a planar surface, on one and on the other of the zones delimited by the edges and the containment walls 64. It can be seen in FIG. 6 that an additional wall 76 extends by protruding from the bottom wall, facing the edge 53 formed by the straight segments. The additional wall 76 has a lower height than that of the edge 53 and it is also formed by straight segments to extend parallel to this edge. A gulley 78 is thus formed between the edge of the housing and the additional wall 76, in which the attached element 34 can be placed.

It can be seen in FIG. 6 that the additional wall 76 and the associated gulley 78 extend to the foot of the chicane formed by the lateral containment walls 64, such that an overlap zone is created between the gulley and the walls.

As is the case in the embodiment illustrated, the depth of the containment cage formed in the housing on one side of the containment walls 64 can be greater than that of the housing on the other side of the containment walls 64. It will thus be possible to house more bulky electronic components.

Figure 9:
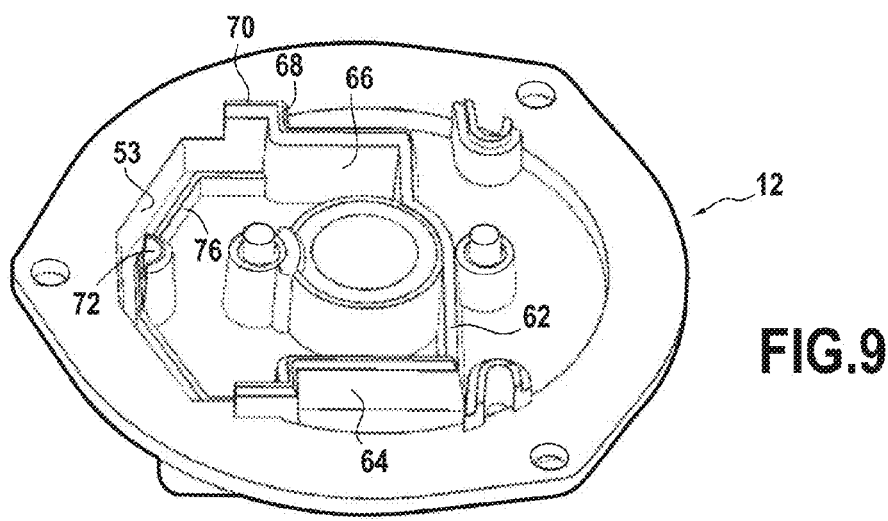
FIGS. 9 and 10 are figures similar to FIGS. 5 and 6, without attached element.
Figure 10:
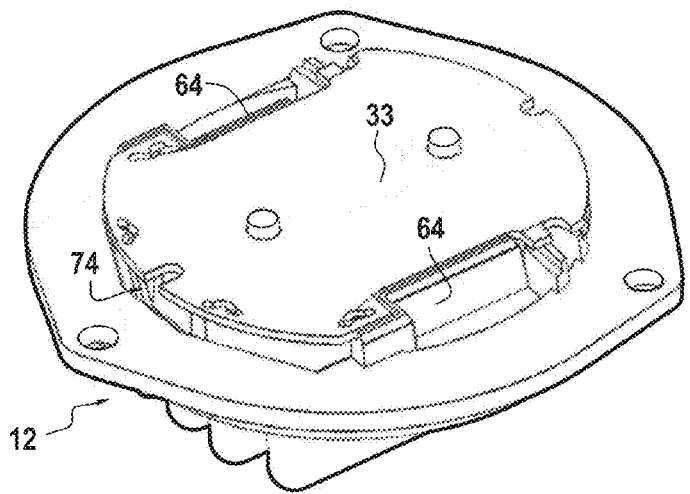

As has just been described, the electromagnetic wave containment cage 52 produced in the light module according to the invention is specific in that it has an opening 74 in a first axial direction. A first mode of use is represented in FIGS. 5 to 8, in which an attached element 34, arranged between the cap 12 and the printed circuit board 33, acts as a closure piece suitable for blocking this opening 74, and the alternative is represented in FIGS. 9 and 10, namely a second mode of use in which the axial opening 74 is left and is not blocked by an attached element 34.

According to one embodiment of the invention, the attached element 34 acting as closure piece is made of a metallic material. This makes it possible to reinforce the attenuation of the electromagnetic disturbances generated by the at least one electronic component.

Figure 8:
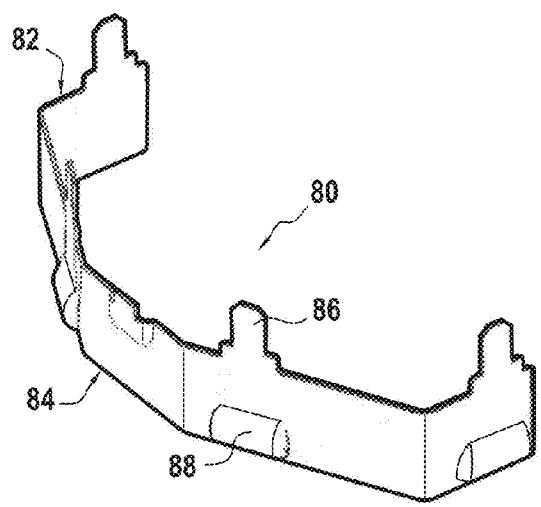
FIG. 8 is a perspective view of the attached piece, in the same orientation as that of FIG. 7.

In the first mode of use, the attached element 34 takes the form of a piece of folded plate 80, visible notably in FIG. 8. The piece of folded plate 80 is folded to take a form of successive straight portions, complementing that of the gulley 78 formed at the axial end of the containment zone 52. Over the length of the piece, a first edge 82 bears fixing means and a second edge 84 is straight. Here, the attached element 34 is secured to the sheet.

The fixing means take the form of tongues 86, each tongue 86 extending by protruding from the first edge 82, in the plane of the straight portion of the piece that it extends.

The piece of folded plate 80 further comprises bosses 88 formed protruding from the plane of the piece of folded plate 80, in the vicinity of the second straight edge 84. The aim of these bosses 88 is to ensure the earthing of the piece of folded plate 80, required to stop the electromagnetic waves generated in the containment zone 52, on the cap 12.

The piece of folded plate 80 is advantageously made of stainless steel, advantageous here for having a good elasticity of the piece of folded plate 80 at the level of the bosses 88 to facilitate the contact of the piece of folded plate 80 with the cap 12 at the level of the gulley 78, and for there to be no oxidation of the piece of folded plate 80.

The height of the attached element 34, acting as closure piece, that is to say the distance between the first edge 82 bearing the fixing means and the planar second edge 84, is slightly less than the distance between the plane of support of the printed circuit board 33 and the bottom of the housing at the level of the gulley 78. In this way, an air passage is left between the bottom of the housing and the attached element 34 acting as closure piece for the opening of the containment zone 52.

There now follows a more detailed description of the cooperation of the printed circuit board 33, of the housing of the cap 12 and of the closure piece of the containment zone 52.

The piece of folded plate 80 is mounted on the printed circuit board 33, by sliding the tongues 86 of the piece of folded plate 80 into the slots 40 formed in the vicinity of an edge of the sheet. The printed circuit board 33 is pushed to abut against the sheet, such that the tongues 86 project from the other side of the sheet and they can be folded back against the face of the sheet opposite the piece of folded plate 80 The latter is thus retained by the printed circuit board 33 and the assembly can be used to be housed between the support casing 6 of the reflector 2 and the cap 12 forming the heat exchange means 10.

To facilitate the mounting, the printed circuit board 33 is placed covering the cavity 22 formed in the support casing 6, with the face of the printed circuit board 33 bearing the diode facing toward the support casing 6 and therefore the attached element 34 facing away from the support casing 6. The complementary indexing means 60 are made to line up to ensure the correct position of the printed circuit board 33, in which the light-emitting diode is facing the cavity 22, suitable for emitting rays through the support casing 6 toward the optical deflection means 4.

The cap 12 is then attached covering the housing 14 of the support casing 6, a seal being first housed between the concentric annular walls 16, 18. Here again, the complementary indexing means 60 are made to line up to bring the cap 12 against the printed circuit board 33, until the sheet is in contact with the containment walls 64 and the top faces of the central bush 54 and of the different indexing means 60. The electronic components, protruding from the sheet, are positioned in the containment zone 52 delimited by the walls of the cap 12 and by the closure piece. Provision can be made for certain components to be arranged on the sheet in such a way that they are situated on the other side of the transverse wall 62, toward the rear longitudinal end, but the housing of the electronic components generating the greatest electromagnetic disturbances in the containment zone 52 will be ensured. The position of the sheet is defined by the cooperation of the indexing means 60, and in this position, the curbs extending the lateral containment walls 64 by protruding extend facing the printed circuit board 33. These curbs block the lateral diffusion of the electromagnetic waves, whereas the transverse wall 62 on which the printed circuit board 33 rests blocks the longitudinal diffusion of these waves toward the rear.

During this positioning, the end of the piece of folded plate 80 is housed in the gulley 78, with the bosses 88 which are deformed to penetrate into this gulley 78 ensuring a contact thereof with the edge of the housing. It is in fact more advantageous for the bosses 88 to be in contact with the edge of the housing rather than the additional wall, which above all acts as a chicane for deflecting the electromagnetic waves.

The cap 12 is then screwed onto the support casing 6 and the printed circuit board 33 is thus on the one hand pressed into the seat formed for this purpose by the lateral containment walls 64 and on the other hand pressed against the transverse wall 62, to hermetically seal the containment zone 52 apart from the opening left at the front longitudinal end.

The electromagnetic waves emitted when the light-emitting diode is operating are contained and can escape only through the front longitudinal end. The additional wall formed by protruding from the bottom wall extends facing the second edge of the attached element and it therefore prevents the waves from passing directly between this second edge and the bottom wall of the gulley 78, while there is a mounting play between this edge and the bottom wall which makes the closure by the attached element not tight, which moreover allows for a cooling of the containment zone 52 by a passage of air.

The electromagnetic waves escaping through the front longitudinal end and blocked by the additional wall come massively into contact with the piece of folded plate 80, which prevents their diffusion outside of the containment zone 52. The very small percentage of these waves escaping from the containment zone 52 by a succession of reflections to pass on the one hand between the additional wall and the closure piece, between this closure piece and the bottom wall, and finally between this closure piece and the edge defining the housing, is thus acceptable. It is particularly advantageous for air to be able to follow the reverse path to allow for a ventilation of the containment zone 52, at the point where a containment zone 52 made entirely tight by the presence of containment walls fully delimiting the zone does not allow for this input of outside air.

In the second mode of use, the axial opening of the containment zone 52 is not closed, no element being added between the printed circuit board 33 and the cap 12. It will be understood that electromagnetic waves can escape through this opening and that this mode of use should be favored when the electronic components soldered on the printed circuit board 33 generate little in the way of electromagnetic disturbances, or when the arrangement of the light module relative to the vehicle interior, or the orientation of the axial opening, makes it possible to disregard the impact of these electromagnetic waves. For example, it may be advantageous to favor the orientation of the light module in the vehicle in such a way that the opening of the containment zone 52 faces away from the vehicle interior, so as to be able to dispense more easily with the presence of the closure piece.

Figure 11:
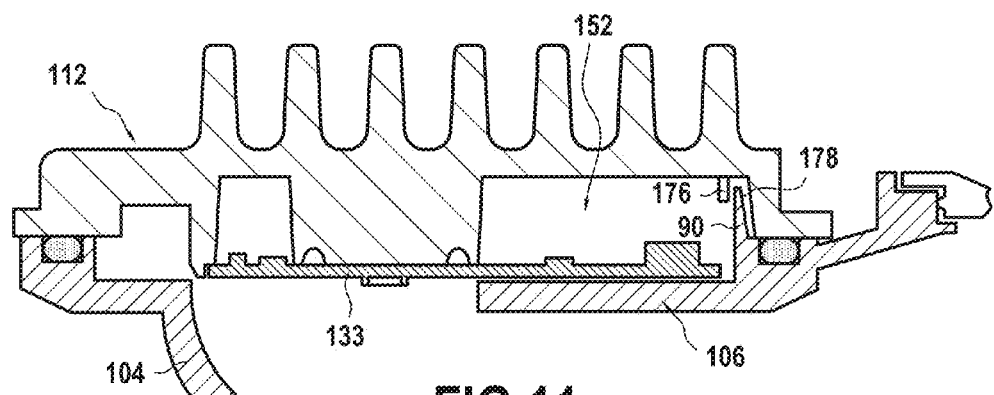
FIGS. 11 and 12 are views, respectively cross-sectional and perspective, of a variant embodiment in which the attached element is replaced by a wall made of a piece with the support casing.

There now follows a description of a variant embodiment, illustrated in FIGS. 11 and 12, in which an equivalent of the attached element is produced by a wall 90 made of a piece with the support casing 106, bearing optical deflection means 104.

The cap 112 is the same, the containment zone 152 remaining unchanged with an opening formed at the front longitudinal end. The printed circuit board 133 is substantially less long in the longitudinal direction, such that it does not cover the gulley 178 formed at this opening by the presence of the additional wall 176. It is a rising wall 90 which extends protruding at right angles from the support casing 106 which acts as the closure piece. The height of this rising wall 90 is determined to extend facing the bottom wall of the gulley 178 when the cap 112 is attached to the support casing 106, as illustrated in FIG. 11. The function remains the same as previously, namely to block the diffusion out of the cap 112 of electromagnetic disturbances. The wall 90 is advantageously coated with a metallic layer, for example by aluminum plating. It is configured to be connected electrically to the cap 112 or to any other type of board support.

Thus, by virtue of the device for attenuating electromagnetic disturbances according to the invention, the containment zone 52, 152 can be adapted to different practical cases, whether there is or is not a closure piece according to the orientation and the position in the vehicle of this device, and whether the closure piece is provided originally in the support casing 6, 106 or whether it is an attached element.

Figure 13:
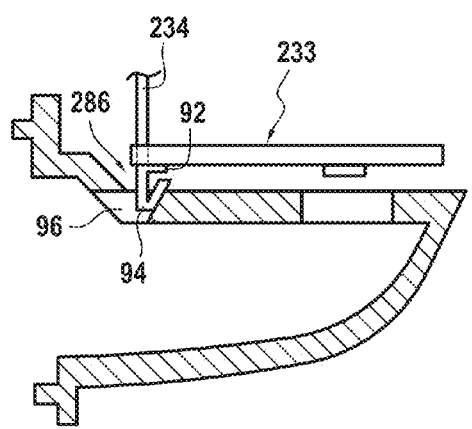
FIG. 13 is a cross-sectional view of another variant embodiment in which the attached element bears a specific tongue for electrical contact with a surface of the reflector.

Another variant embodiment is illustrated in FIG. 13, whereby the closure piece is electrically connected to a metallic surface of the reflector. The attenuation by the closure piece of the electromagnetic disturbances generated by the at least one electronic component is thus reinforced. This metallic surface of the reflector can be a reflecting surface of the reflector, notably that intended to return the light rays originating from the light source of the light module. This surface can, for example, be a metallic layer deposited on a material, notably by aluminum plating. In the variant illustrated in FIG. 13, the tongues 286 have a first tab 92 designed to ensure the securing of the attached element 234 relative to the printed circuit board 233 (the board support not being represented here) and a second tab 94 designed to be electrically connected to a metallic surface of the reflector. The second tab 94 is here introduced into a specific opening 96 to facilitate the contact between the attached element and the tongue 286. It will be understood that the tongue 286 could have another form and other dimensions to come into contact with other parts of the reflector.

The above description explains clearly how the invention makes it possible to achieve the objectives set for it and notably to propose a device for attenuating electromagnetic disturbances which allows for a great degree of modularity. A decision is advantageously made, depending on the orientation and the distance relative to the vehicle interior of the light source and of the electronic components borne by the printed circuit board and generators of electromagnetic waves, as to whether or not a closure piece should be placed to close the containment zone. In the first embodiment where the closure piece is formed by an attached element, it will further be possible to have a device made of two materials, with the plastic production of almost all of the device, such that the production by molding makes it possible to produce a specific design according to the layout of the components, only the attached closure piece being produced by a piece of plate.

Another main advantage of the device according to the invention is to provide a closure of the containment zone which is not tight for the correct ventilation of the interior of the containment zone. The presence of the closure piece, made of one and the same piece or an attached element, and the presence of chicanes formed in the housing receiving the printed circuit board and the closure piece, make it possible to avoid the electromagnetic leaks, without in any way preventing the circulation of air which allows for the cooling of the interior of the containment zone.

Obviously, various modifications can be made by those skilled in the art to the structures of the light module, which have just been described by way of nonlimiting examples.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for attenuating electromagnetic disturbances given off by at least one electronic component, arranged on a printed circuit board which is mounted on a first face of a board support and which bears at least one light-emitting diode driven by said at least one electronic component for the emission of light rays, said device comprising an electromagnetic wave containment cage arranged around said at least said electronic component, wherein said electromagnetic wave containment cage is formed partially by containment walls made of a piece with said first face of said board support and on which said printed circuit board rests, so as to delimit, in said board support and on said printed circuit board, a wave containment zone, said wave containment zone having an opening, in a first direction, suitable for being blocked, according to the attenuation needs of said device, by a closure piece distinct from said containment walls.

2. The device according to claim 1, wherein said containment walls comprise two lateral walls and a transverse wall linking them at a longitudinal end, delimiting between them said containment zone with said opening.

3. The device according to claim 2, wherein said transverse wall has a substantially planar free end on which said printed circuit board bears in such a way that it extends on either side of said transverse wall.

4. The device according to claim 3, wherein said printed circuit board bears a plurality of electronic components which are distributed, according to their capacity to produce electromagnetic disturbances, on either side of said transverse wall.

5. The device according to claim 2, wherein said lateral walls have a free end such that a curb prolongs a side of said lateral wall opposite said containment zone, by forming a seat for receiving a lateral end of side printed circuit board.

6. The device according to claim 1, wherein said board support is hollowed out at least in said containment zone, such that an edge extends along said opening of said containment zone.

7. The device according to claim 6, wherein a bottom wall of said containment zone comprises an additional wall which extends facing said edge in proximity to said opening, such that a gulley runs along said edge between the latter and said additional wall.

8. The device according to claim 1, wherein said at least one light-emitting diode is arranged on an outer face of said printed circuit board, turned away from said board support, whereas said at least one electronic component is arranged on an inner face of said printed circuit board, turned toward said board support, so as to be housed in said containment zone.

9. The device according to claim 1, wherein said board support bears heat exchange means on its outer face.

10. The device according to claim 1, wherein said board support is a closure cap.

11. A light module for lighting and/or signaling of a motor vehicle, wherein said light module comprises a device for attenuating electromagnetic disturbances according to claim 1, said at least one light-emitting diode being suitable for emitting light rays toward optical deflection means so that these rays are directed toward an output face of said light module, said light module comprising a support casing formed to house said printed circuit board for the correct positioning of said at least one light-emitting diode.

12. The light module according to claim 11, wherein a closure piece blocks said opening.

13. The light module according to claim 12, wherein said closure piece is distinct from said walls.

14. The light module according to claim 12, wherein said closure piece is an element attached to said printed circuit board so as to extend between said printed circuit board and said board support.

15. The light module according to claim 14, wherein said closure piece is designed to be fixed to a first end of said printed circuit board and to be housed at the other end in a gulley formed in said board support.

16. The light module according to claim 15, wherein said board support is hollowed out in such a way that it forms a housing for said at least one electronic component for driving the operation of said at least one light-emitting diode, said gulley being formed by an edge of said housing and an additional wall which extends substantially parallel to said edge.

17. The light module according to claim 15, wherein a height of said closure piece is such that said closure piece extends in said gulley without contact with said bottom wall of said gulley.

18. The light module according to claim 17, wherein said closure piece comprises bosses, which extend by protruding from a plane of a piece substantially in the vicinity of an end suitable for being housed in said gulley.

19. The light module according to claim 12, wherein said closure piece is a piece of folded plate.

20. The light module according to claim 19, wherein said piece of folded plate comprises tongues which prolong, in a plane of said closure piece, the edge of said closure piece suitable for being in contact with said printed circuit board, said tongues being suitable for cooperating with slots formed in said printed circuit board.

21. The light module according to claim 20, wherein said tongues are electrically connected to a metallic surface of said support casing.

22. The light module according to claim 19, wherein said piece of folded plate is made of stainless steel.

23. The light module according to claim 12, wherein said closure piece is a wall made of a piece with said support casing.

24. The light module according to claim 11, wherein said opening faces in the same direction as that of emission of the light by said light module.

25. The light module according to claim 11 wherein the device for attenuating electromagnetic disturbances is a device given off by at least one electronic component, arranged on a printed circuit board which is mounted on a first face of a board support and which bears at least one light-emitting diode driven by said at least one electronic component for the emission of light rays, said device comprising an electromagnetic wave containment cage arranged around said at least said electronic component,
wherein said electromagnetic wave containment cage is formed partially by containment walls made of a piece with said first face of said board support and on which said printed circuit board rests, so as to delimit, in said board support and on said printed circuit board, a wave containment zone, said wave containment zone having an opening, in a first direction, suitable for being blocked, according to the attenuation needs of said device, by a closure piece distinct from said containment walls.

26. The light module according to claim 11, wherein said board support is a cap making it possible to close said casing.

27. The light module according to claim 26, wherein said casing is a case of said light module, said case comprising a first orifice closed by a closure outer lens forming said output face of said light module, and a second orifice closed by said cap.

28. The light module according to claim 27, wherein said casing comprises an internal wall forming a reflecting wall, said optical deflection means comprising said reflecting wall or being formed by said reflecting wall.

* * * * *

UNITED STATES PATENT AND TRADEMARK OFFICE
CERTIFICATE OF CORRECTION

| | |
|---|---|
| PATENT NO. | : 9,702,528 B2 |
| APPLICATION NO. | : 14/694202 |
| DATED | : July 11, 2017 |
| INVENTOR(S) | : Franck Dinant et al. |

Page 1 of 1

It is certified that error appears in the above-identified patent and that said Letters Patent is hereby corrected as shown below:

In the Claims

Column 12, Line 9, delete "side" and insert --said-- therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*